United States Patent [19]

Perez

[11] Patent Number: 4,825,135
[45] Date of Patent: Apr. 25, 1989

[54] METHOD AND APPARATUS FOR PROVIDING MECHANICAL AMPLIFICATION

[75] Inventor: Keith J. Perez, Seattle, Wash.

[73] Assignee: Hypermotion, Inc., Seattle, Wash.

[21] Appl. No.: 121,532

[22] Filed: Nov. 17, 1987

[51] Int. Cl.⁴ .............................................. G05B 19/42
[52] U.S. Cl. .................................. 318/568.17; 104/166
[58] Field of Search ............................ 318/568; 104/166

[56] References Cited

U.S. PATENT DOCUMENTS

| | | | |
|---|---|---|---|
| 3,164,104 | 1/1965 | Hunt | 104/166 |
| 3,842,752 | 10/1974 | Harwick | 104/166 |
| 3,861,322 | 1/1975 | Danly | 104/166 |
| 3,903,810 | 9/1975 | Jones | 104/166 |
| 4,036,148 | 7/1977 | Jones et al. | 104/166 |
| 4,065,007 | 12/1977 | Kurahashi | 414/384 |
| 4,078,499 | 3/1978 | Giraud | 104/165 |
| 4,338,864 | 7/1982 | Ziegenfus | 104/121 |
| 4,347,792 | 9/1982 | Nagahori | 104/166 |
| 4,355,581 | 10/1982 | Mitani | 104/166 |
| 4,359,000 | 11/1982 | Tokunaga | 104/166 |
| 4,603,720 | 8/1986 | Jacoby | 152/209 R |

*Primary Examiner*—William M. Shoop, Jr.
*Assistant Examiner*—Saul M. Bergmann
*Attorney, Agent, or Firm*—Seed and Berry

[57] ABSTRACT

Method and apparatus are disclosed for providing mechanical amplification particularly suited for the driving system of mechanical robots. An electronic control system is provided for interfacing a user with the robot driving system. The robot driving system includes a mechanical motion control system coupled to receive electric control signals from the electronic control system and to provide in response thereto precision linear movement indicative of the movement required of the mechanical driving system. A high-power motor is provided for rotating a cylinder to thereby provide the input driving power to the mechanical amplifier. A linear drive system responds to rotation of the cylinder and the precision movements of the mechanical motion controller to traverse the cylinder and thereby provide the mechanical motion output.

20 Claims, 3 Drawing Sheets

METHOD AND APPARATUS FOR PROVIDING MECHANICAL AMPLIFICATION

DESCRIPTION

1. Technical Field

The present invention is related to mechanical energy amplifiers and, more particularly, to apparatus and method for providing precision mechanical movement at high power output in response to a low power mechanical input.

2. Background of the Invention

In recent years the field of robotics (robot is used herein in its most general sense to refer to any apparatus which is adapted to perform mechanical motion) has grown tremendously making automated manufacture of products inexpensive, practical and, consequently, desirable. Many breakthroughs in robotics have been due primarily to advancements made in semiconductor and computer technology, thus making operation of robots a programmed function as opposed to a mere extension of human manipulation. Due to this advancement, robots are able to perform more complicated tasks with less human supervision, making manufacture of products with robotics more cost-effective.

One area, however, where adaptation of robots to product manufacture has proved difficult is in the manufacture of large or heavy products. In this and related areas, robots are required to perform tasks which require large power output from the robots. Further, many times these same robots are required to simultaneously perform precision movements in order to manufacture the product within acceptable tolerances. The robotics industry has, however, failed to provide robots which are capable of high power output while performing precision movements. Also, the cost of presently available robots rises exponentially with increase in either power output or precision requirements.

Further, the industry has not allowed for miniaturization of high power, precision robots While some miniaturized robots can be provided to perform high power and/or precision tasks, costs for these robots are unacceptably high What is needed, therefore, is a miniature robot which can provide high-power, precision output and which can be produced at reasonable costs.

In an effort to meet the industry standards of high power, precision, miniature robots, the industry has provided semi-custom robots. A precision motor is coupled to the robotic mechanism via gears, levers and other mechanical manipulators. Semi-custom parts are provided in an effort to reduce costs while meeting the power output requirements. Such robots are time consuming and costly to build. A further disadvantage is that when it in necessary to revise or otherwise re-adapt the robot to perform new functions or to provide higher power and/or greater precision output, the entire system must be redesigned and rebuilt.

Still another drawback of presently available robots is the tendency of these robots to overshoot their destination when traversing from one point to another, resulting in oscillation about their final destination. In an attempt to prevent such overshoot and resultant oscillation, the industry has provided complex processing controllers which execute detailed algorithms designed to slow the robot upon approach and thereby prevent it from overshooting its final destination. Such controllers coupled with their necessary algorithms are expensive adding to the overall cost of the robot.

Presently available robots are also unable to compensate for loads which are in excess of their rated capacity. In order to increase the capacity of the robot, it must be redesigned using a larger motor, reduction gears or both with a concomitant rise in cost and complexity. Accordingly, presently available robots can only be used for tasks which are within their current capacity limitations.

It is desirable, therefore, to provide a miniature robot driving system which is capable of providing high power output and precision movements. It is further desirable to provide such a robot at low cost. It is also desirable to provide a robot which is capable of providing variable levels of power output without costly redesign. It is still further desirable to provide a robot which moves from one point to another without overshooting its destination. It is desirable to provide such a non-overshoot robot without the need of complex processing and computer programming.

DISCLOSURE OF THE INVENTION

It is, therefore, a primary object of the present invention to provide a driving system for a miniature robot which is capable of providing high power, precision output.

It is another object of the present invention to provide a driving system for a miniature robot which is capable of providing high power, precision output and which can be manufactured at a reasonable cost.

It is still another object of the present invention to provide a robot which is capable of providing various levels of high power, precision output without costly redesign.

It is a further object of the present invention to provide a robot which is capable of providing high power precision movements at low production costs.

It is still another object of the present invention to provide a robot which moves from one point to another without overshooting its final destination.

It is still a further object of the present invention to provide a robot which moves from one point to another without overshooting its final destination and further without the necessity of providing complex processors and programming.

These and other objects of the present invention are achieved by providing a robot driving system which provides high-power, precision mechanical motion. A motion control system includes a control arm and is responsive to an input for displacing the control arm. A power drive source includes an elongate cylinder and means for rotating the cylinder, e.g., a motor. A linear drive system including a trolley assembly provides the mechanical motion output. The linear drive system also includes linear guide means for coupling the trolley assembly to the cylinder and for restricting the movement of the trolley assembly to linear movement. The linear drive system is responsive to rotation of the cylinder and displacement of the control arm for propelling the trolley assembly along the cylinder in a manner such that the displacement of the trolley assembly along the cylinder is substantially equal to the displacement of the control arm.

In an alternative embodiment, the robot drive apparatus also includes an electrical control system which is adapted to determine the speed of the trolley assembly. The electrical control system is also adapted to respond to the determined speed of the trolley and to respond to user supplied inputs to modulate the position, speed and acceleration of the control arm and thereby control the position, speed and acceleration of the trolley.

Detailed Description of Drawings

Apparatus which is considered to be invention is particularly pointed out and distinctly claimed in the numbered paragraphs appended hereto. The invention, however, both as to organization and method of practice, may best be understood by a reading of the following detailed description taken in conjunction with the drawings in which:

FIG. 1A, is a perspective view of the servomotor of FIG. 1;

DETAILED DESCRIPTION

Figure 1:
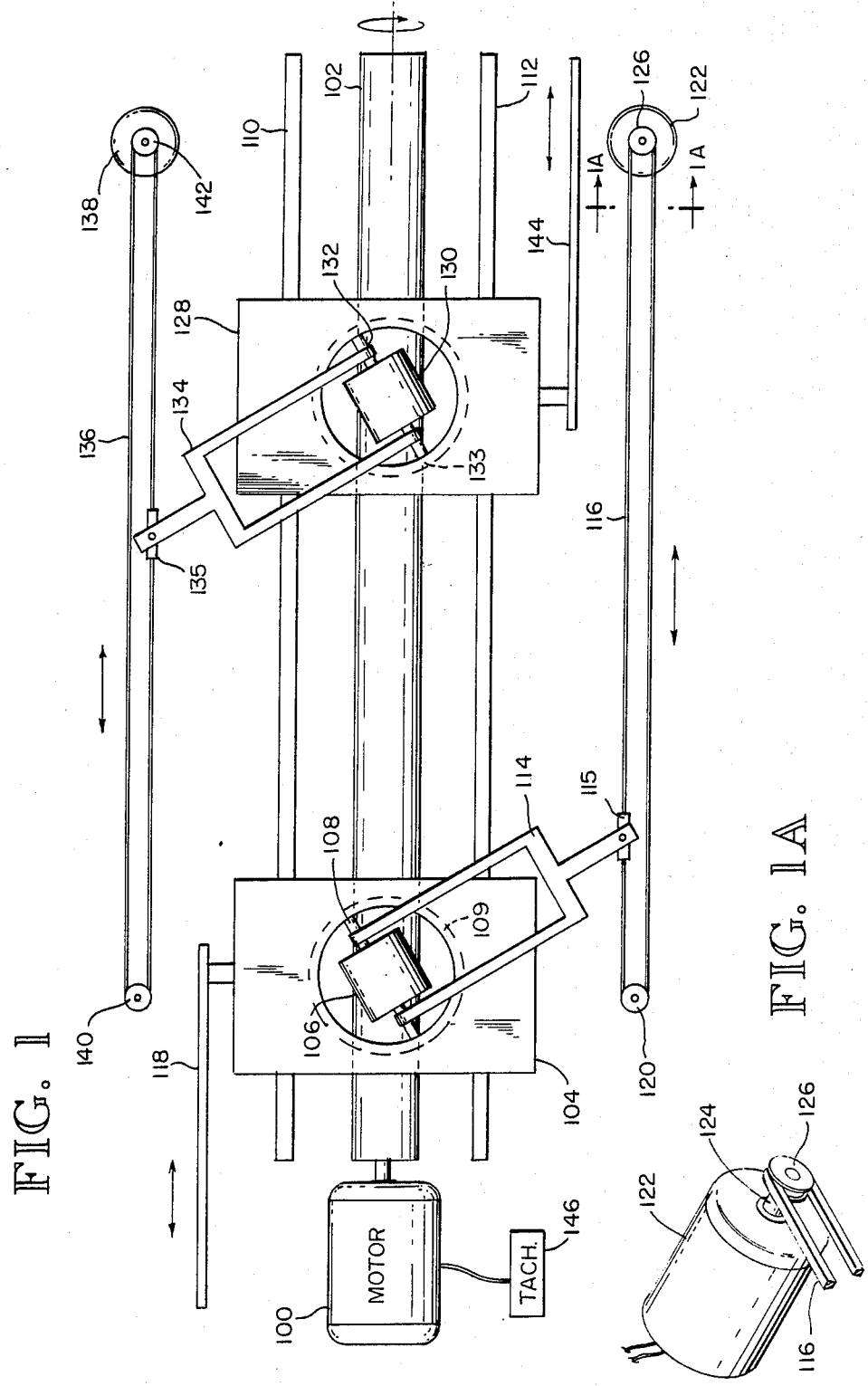
FIG. 1 is a schematic diagram of the mechanical amplifier which is the subject of the present invention.

Referring to FIG. 1, a schematic diagram illustrating one embodiment of the subject invention is provided. Therein, a relatively large power motor 100 is provided for rotating an elongated cylinder 102. Motor 100 is generally of the type which is adapted to provide a large power output.

Cylinder 102 is adapted to provide driving power to a linear drive system. The linear drive system comprises a movable carriage, or trolley, assembly 104. A steerable wheel is connected to the carriage assembly, such as by mounting it in the circular aperture in the top of the carriage. As will be described more fully below, wheel 106 turns in response to rotation of cylinder 102 and imparts a propelling force to movable carriage 104. Wheel 106 is positioned to frictionally engage cylinder 102 and is adapted to freely rotate on axle 108 mounted on axle assembly 109 in response to rotation of cylinder 102.

Movable carriage 104 includes a rotational bearing guide system which permits rotation of the axle assembly 109. Bearings (not shown) are mounted on the movable carriage 104 to permit rotational movement of the ends of axle 108 within the circular aperture of movable carriage 104. In this manner, the wheel 106 is permitted to turn about an axis normal to the top of the movable carriage 104.

In equilibrium, the longitudinal axis of cylinder 102 is parallel with the longitudinal axis of axle 108. Hence, in equilibrium wheel 106 rotates in a direction opposite to that of cylinder 102 and no propelling force is imparted to movable carriage 104. As axle assembly 109 is rotated, a non-zero attack angle is created between the longitudinal axes of cylinder 102 and axle 108. Steerable wheel !06 responds to the non-zero attack angle to provide a propelling force to movable carriage 104. Movable carriage 104 traverses cylinder 102 in a manner to reduce the attack angle to zero and return the system to equilibrium. The speed at which the movable carriage 104 traverses the cylinder is proportional to the magnitude of the attack angle: high speed for large angles and lower speed for smaller angles. Further, the acceleration of the movable carriage 104 can be controlled by the rate of change of the magnitude of the attack angle.

The linear drive system also includes a provision, such as a pair of guide rails 110 and 112, to restrict the motion of movable carriage 104 to linear movement along cylinder 102. Carriage 104 includes a provision, such as friction reducing bearings (not shown) which couple it to guide rails 110 and 112 to create a linear bearing guide system.

The linear drive system further includes a tiller mechanism 114 which is coupled to axle assembly 109. The tiller mechanism 114 is provided for rotating the axle 108 within the aperture of the movable carriage 104. Such rotation alters the attack angle between the longitudinal axes of the cylinder 102 and the axle 108. In this manner, the tiller mechanism 114 provides the control input to the linear drive system. Motor 100 and cylinder 102 provide the power input to the linear drive system.

The movable carriage 104 is also coupled to the object to be moved, such as a linear arm assembly 118. It is noted that the amount of power which is applied to the arm assembly 118 is a function of the input power from high power motor 100 as well as the coefficient of friction between steerable wheel 106 and cylinder 102.

Tiller mechanism 114 is coupled to receive its input from a motion control system. The motion control system receives control signals from an electronic control system (as will be described more fully below) and converts the control signals to controlled mechanical movement. The tiller mechanism 114 responds to the mechanical movement provided by the motion control system to rotate steerable wheel 106, alter the attack angle and initiate motion of the linear drive system.

The motion control system comprises a continuous belt 116 which is adapted for bidirectional movement as shown in FIG. 1. The belt is connected to the tiller via a control arm 115 The continuous belt 116 is coupled to a pulley assembly including an idler 120 and a relatively low power servomotor 122. As shown more clearly in FIG. 1A, low power motor 122 drives shaft 124 to rotate drive pulley 126 to move the continuous belt 116. As further shown in FIG. 1A, the low power motor 122 is adapted to receive electrical signal input, which input is indicative of the amount of movement required of continuous belt 116.

The motion control system also includes a feedback transducer, such as a tachometer 146. The tachometer 146 is coupled to motor 100 and provides an output signal which is indicative of the speed of motor 100. The tachometer 146 provides its output signals to the electronic control system such that the motion (position, speed and acceleration) of the movable carriage may be more fully controlled as will be described below The transducer 146 may consist of any device (or combination of devices) for providing electrical feedback indicative of the speed of motor 100. More generally, the transducer may comprise any device for determining, either directly or indirectly, the speed of the movable carriage 104, the magnitude of the attack angle or any other parameter indicative of the system's output. In such embodiments, two or more transducers may be desired for monitoring, e.g., the magnitude of the attack angle and the speed of the movable carriage.

In operation, the linear drive system responds to input from the motion controller and responds to the rotational driving power provided by motor 100 and cylinder 102 to propel output arm 118 in the same direction as the run of the continuous belt 116 which is connected to the tiller. As the run of continuous belt 116 connected to the tiller moves to the right or left, steerable wheel 106 is rotated altering the attack angle and propelling movable carriage 104 as described above. It is to be noted that the distance which movable carriage 104 and, hence, arm 118 is displaced is equal to the displacement of control arm 115.

In the preferred embodiment, low power motor 122 may comprise a stepper motor with an incremental encoder as is known in the art. Such motors provide precision rotational output in response to an electrical input signal. Also, such motors provide such precision movement at reasonable costs. It will be appreciated, however, by those skilled in the art that the combination of motor 122, pulleys 120 and 126, and continuous belt 116 comprise the motion control system which provides a precision linear displacement in response to electrical input signals.

Also shown in FIG. 1 is a second linear drive system including: a movable carriage 128; a steerable wheel 130 mounted to movable carriage 128 via an axle 132 and an axle assembly 133; a tiller mechanism 134 adapted to rotate steerable wheel 130; a control arm 135, and, an output arm 144. Coupled to control the second linear drive system, shown in FIG. 1, is a second motion control system including a continuous belt 136 and a precision motor 138 coupled to continuous belt 136 via pulleys 140 and 142 to provide precision linear movement to tiller mechanism 134 in response to electrical input provided to motor 138.

The second linear drive system and second motion control system are illustrated for showing the relative ease with which a second motion output can be provided from the mechanical amplifying system. It will be readily appreciated by those skilled in the art that a plurality of outputs can be coupled to the same high power input 100, limited only by the length of cylinder 102. Also, it will be appreciated that several displacement assemblies may be mounted to cylinder 102 on opposite sides or about the perimeter thereof each adapted for independent motion by a respective low power motor. Many other arrangements for adding multiple outputs will readily become apparent to those skilled in the art.

A particular advantage of adding multiple outputs to the mechanical amplifier of the present invention is that each output can be driven from the same high power motor 100. Also, additional outputs can be readily and inexpensively added at any time, thereby greatly reducing redesign cost of a robotic system. Further, each output which is driven from a single power motor 100 potentially has available as its output substantially all of the power provided by motor 100. Hence, the designer does not pay a power output penalty by adding multiple outputs A further advantage of the present invention is that it is capable of moving very heavy loads. The only limitation on the capacity being the coefficient of friction between steerable wheel 106 and cylinder 102, as well as limitations imposed by the strength limitations of the mechanical components. As the value of the coefficient of friction decreases, so does the capacity of the system to handle large loads. The capacity for moving large loads is not, however, limited by the power supplied by motor 100. Accordingly, to maximize motive capacity, a high coefficient of friction is desired between cylinder 102 and steerable wheel 106. To this end, steerable wheel 106 preferably comprises a polymer having a high coefficient of friction, e.g., nylon. The cylinder 102 may also comprise a material having a high coefficient of friction, however, it is also necessary for the cylinder 102 to be both durable and weatherable. In the presently preferred embodiment, the cylinder comprises an aluminum material having a treated, or granular surface to increase the frictional forces between the cylinder and the steerable wheel.

The mechanical amplifier of the subject invention will not overshoot its final destination and result in oscillations thereabout. Instead, movable carriage 104 will respond to the linear movement of continuous belt 116 to move the system just to equilibrium, i.e., the position at which the attack angle is zero. Since movable carriage 104 will not overshoot its final destination, sophisticated controllers and programming designed to provide electrical signals to motor 122 to prevent overshoot are not required.

While the subject invention is shown as providing linear output via arms 118 and 144, rotational output may also be provided. Various devices are currently available for converting linear motion to rotary motion. As an example, a continuous belt similar to belt 116 can be coupled to idler bearings to provide rotation in response to linear displacement of the continuous belt.

Figure 2:
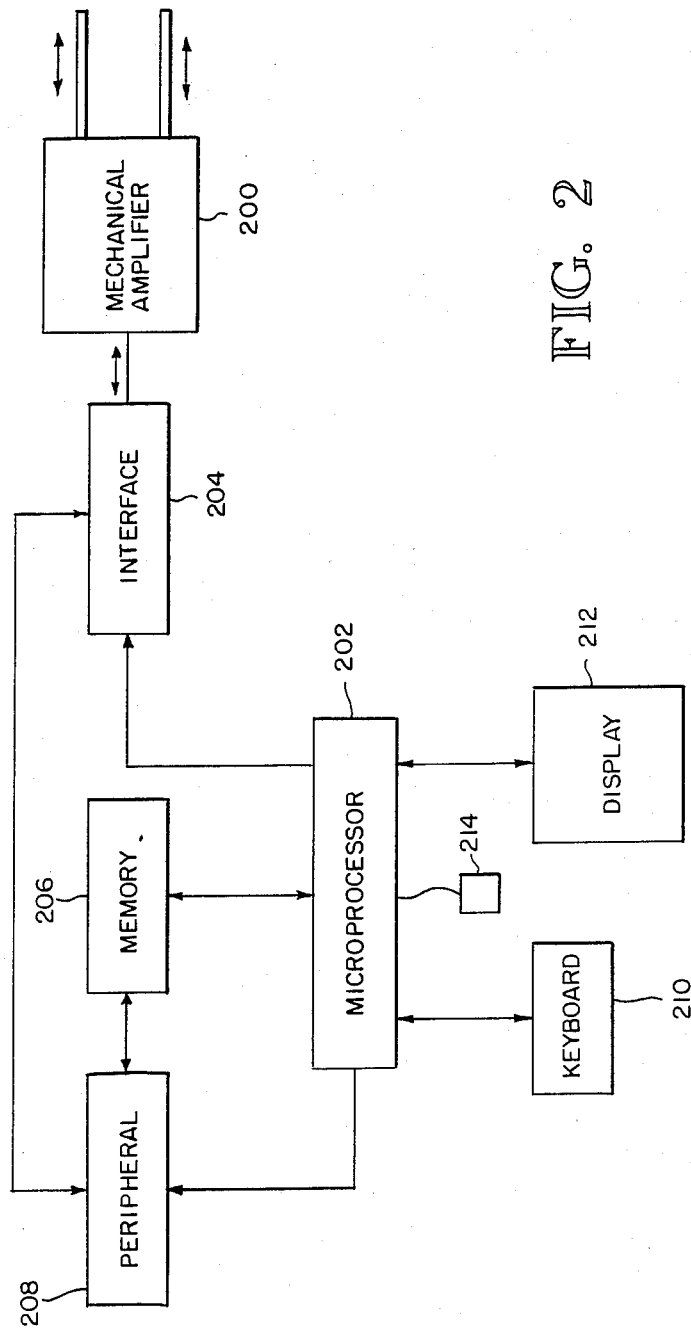
FIG. 2 is an illustrative block diagram of the control system for the energy amplifier which is the subject of the present invention.

With reference to FIG. 2, there is shown an illustrative block diagram of the control system for the mechanical amplifier of the subject invention. Therein, the amplifier of FIGS. 1 and 1A is shown generally as mechanical amplifier 200 including two linear outputs. As mentioned above, the mechanical amplifier of FIG. 1 can be provided with a plurality of outputs as desired.

Mechanical amplifier 200 is coupled to receive control signals from a Central Processing Unit, such as 202 via an interface 204. The CPU may comprise any conventional data processor for performing the data processing operations described herein. In the preferred embodiment, CPU 202 comprises an Intel 8086 microprocessor. Interface 204 comprises circuitry for adapting the control signals received from CPU 202 for use by mechanical amplifier 200. Particular designs for interface 204 may be readily provided by those skilled in the art. As an example, interface 204 may comprise buffers, timers, shift registers, multiplexers, digital-to-analog (D/A) converters, etc.

CPU 202 is coupled to memory 206 for receiving program instructions, as well as, transferring data to and from memory 206. As is known in the art, memory 206 may comprise random access memory (RAM) for storing data and other parameters as well as read-only memory (ROM) for storing program data for use by CPU 202.

CPU 202, memory 206 and interface 204 are each coupled to peripheral circuitry 208. Peripheral circuitry 208 comprises timers, oscillators, shift registers, multivibrators, buffers and other circuitry necessary for proper operation of CPU 202, memory 206 and interface 204. Components for use in peripheral circuitry 208 are currently available as off-the-shelf items. Various configurations for the peripheral circuitry can be readily supplied by those skilled in the art in conjunction with selection of CPU 202, interface 204 and memory 206.

CPU 202 is coupled to communicate with a user of the mechanical amplifier via output devices, such as display 212, in response to inputs from input devices, such as keyboard 210 and mouse 214. Typically, display 212 is a cathode ray tube (CRT) or a similar screen for viewing by the user. Mouse 214 comprises a device capable of providing mapping signals to CPU 202 to indicate the relative positioning of mouse 214. The mapping signals provided by mouse 214 are typically used for drawing or positioning a cursor on display 212. Mouse 214 may be selected from a number of off-the-shelf devices which are currently available.

CPU 202 is also adapted to communicate with other electronic control systems via an interface 216. Interface 216 may be comprised of components similar to those of interface 204 and may also be readily provided by those skilled in the art. The addition of interface 216 allows for several mechanical amplifiers to perform sequential tasks by coupling their electronic controllers via their respective interfaces 216.

The combination of keyboard 210, display 212 and mouse 214 are provided for interfacing a user of mechanical amplifier 200 with CPU 202. Similarly, CPU 202, interface 204, memory 206, peripheral circuitry 208, keyboard 210, display 212 and mouse 214 comprise an electronic control system for interfacing a user with the mechanical amplifier to thereby allow the user to control the amplifier. It will be appreciated by those skilled in the art that CPU 202, memory 206, peripheral circuitry 208, keyboard 210, display 212 and mouse 214 may comprise a personal computer as is known in the art. Conversely, these devices may be provided as part of a custom control device dedicated to operation of mechanical amplifier 200.

In operation, the electronic control system controls the operation of mechanical amplifier 200. The electronic control system must first be programmed to provide the necessary control signals for specific movements of the amplifier output. Programming of the electronic control system may be accomplished by a variety of presently known methods. A particularly useful method, which makes advantageous use of mouse 214, allows for programming of the control system by positioning mouse 214 to position the amplifier output.

In this mode of programming, the output arms of mechanical amplifier 200 are controlled by CPU 202 to move in response to relative movement of mouse 214. Simultaneous with each movement, CPU 202 stores within memory 206 control signals associated with the move such that the control signals can later be recalled simply by identifying the move. This method of programming is both efficient and effective.

It is to be noted that CPU 204 is capable of controlling multiple motion controllers by providing adequate capacity within memory 206. Similarly, one electronic control system is capable of controlling multiple mechanical amplifiers. Hence, it is feasible to provide a single electronic controller (such as the personal computer discussed above) for providing a multiplicity of mechanical amplifiers. In the preferred embodiment, however, each mechanical amplifier is to be provided with a dedicated electronic controller: the dedicated controller to increase speed of a robot system at a minimum cost increase.

After the electronic control system is programmed, the robot driving system is ready for operation. The electronic control system responds to either a user input or an input from another electronic controller to perform one or a series of mechanical motions. During each motion, CPU 202 responds to data and program storage within memory 206 to provide control signals to the motion controller of the mechanical amplifier.

As mentioned above, a particular advantage of the present mechanical amplifier is that it is capable of providing large amounts of output power, limited only by the mechanical strength of the system's components as well as the coefficient of friction between steerable wheel 106 and cylinder 102. This is due in part to a novel method for operating the mechanical amplifier. Generally, it has been noted by the inventor that the load which may be moved by amplifier 200 may be increased simply by decreasing the rate of motion, i.e., the rate at which the load is moved. To this end, transducer 146 is coupled to motor 100 for providing an electrical signal to interface 202 indicative of the speed of motor 100. At times when the large motor speed is below its nominal value, the signal from transducer 146 will indicate a reduced speed thereby indicating an increase of load on the mechanical amplifier CPU 202 will respond to the increased load to reduce the rate of motion thereby allowing the amplifier to move the increased load.

Figure 3:
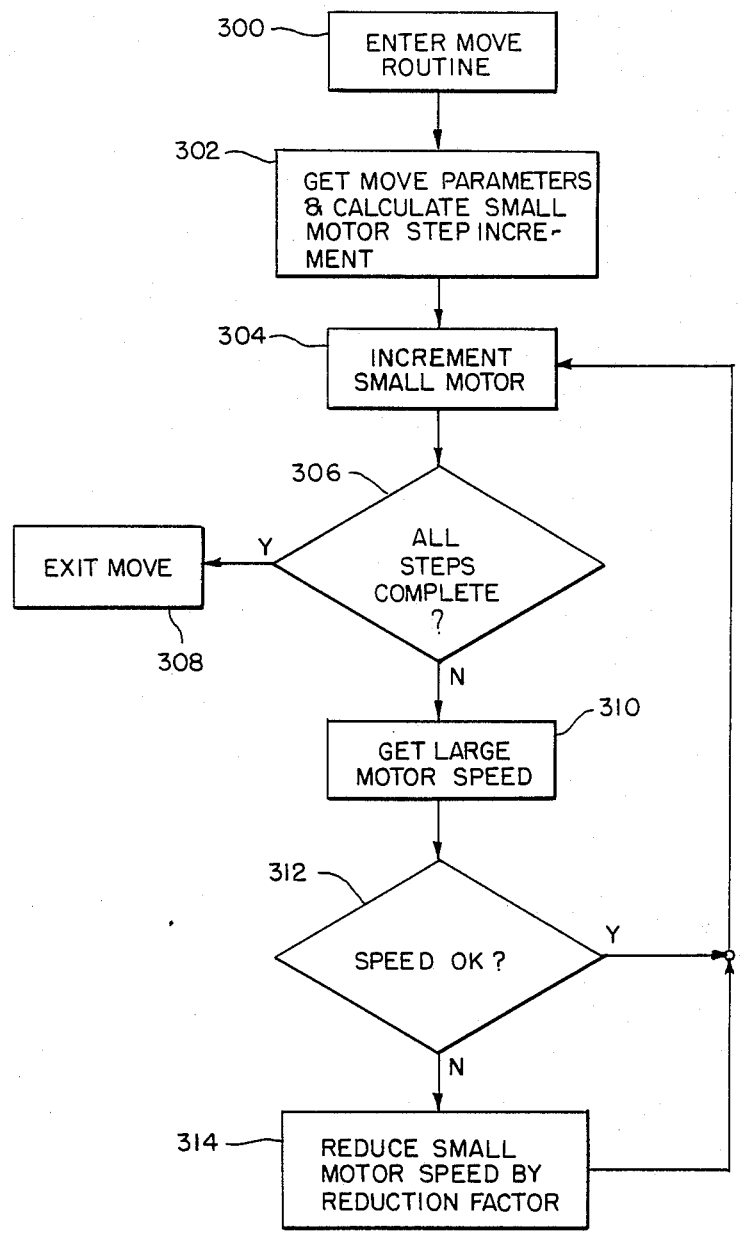
FIG. 3 is a decisional flow diagram illustrating a novel method for controlling the energy amplifier of the subject invention.

With reference to FIG. 3, there is provided a move routine which CPU 202 executes to control the rate of motion of mechanical amplifier 200. After entering the move routine, step 300, CPU 202 receives the move parameters from memory 206 and calculates the small step motor increment, step 302. The small motor increment is a move parameter which indicates both the rate and displacement of the move to be executed. The increment may be stored directly in memory 206 or calculated in real time as in the presently preferred embodiment.

CPU 202 then increments the small motor one step, step 304, and determines whether all steps have been completed, step 306 If all steps have been completed, then CPU 202 exits the move routine, step 308. If all steps have not been completed, then CPU 202 determines the large motor speed by monitoring the output of transducer 146, step 310. If the large motor speed is okay, that is, if the large motor speed is greater than or equal to its nominal value, step 312, then CPU 202 returns to step 304 and again increments small motor 122. If, however, the large motor speed is below its nominal value, then CPU 202 will reduce the speed of small motor 122 by a reduction factor, step 314, before returning to step 304.

It will be appreciated by those skilled in the art that the reduction factor may be a predetermined amount of speed or, alternatively, may be determined dynamically. It will further be appreciated by those skilled in the art that the reduction factor will be dependent upon: (1) the number of small motors stepping; and, (2) the system mechanical load (which is determined by the decrease in motor speed).

Further, it will also be appreciated by those skilled in the art that CPU 202 will be able to perform many other functions while performing the move routine shown by FIG. 3. Accordingly, step 304 may include a wait or jump command which allows CPU 202 to perform other functions until it is time to again increment the small motor. Other methods for implementing the move routine shown in FIG. 3 will readily become apparent to those skilled in the art.

When controlling multiple axes of motion, the electronic control system may be adapted to respond to a reduced speed signal from transducer 146 in a variety of ways. As an example, CPU 202 may be adapted to reduce the speed of each moving axis a proportionate amount thereby to reduce the instantaneous load on power driving motor 100. Alternatively, each axis of motion may be assigned priorities such that the motion of one or more may be temporarily interrupted to allow movement of the large load. As another alternative, a combination of the above methods may be implemented. A variety of other methods will readily become apparent to those skilled in the art.

The method described above can be expanded to further allow control of the speed and acceleration of the movable carriage by controlling the magnitude of the attack angle and the rate at which the attack angle is increased (or decreased) while monitoring the position of the trolley. Hence, loads can be moved faster by increasing the magnitude of the attack angle Similarly, loads can be moved slower by decreasing the magnitude of the attack angle. A load can approach a destination at constant speed by providing an attack angle of constant magnitude until the load reaches its destination and thereafter decreasing the attack angle to zero. Other variations for controlling the movement of loads with apparatus of the present invention will readily become apparent to those skilled in the art.

While only several presently preferred embodiments of my novel mechanical amplifier have been described in detail herein, many modifications and variations thereof will readily become apparent to those skilled in the art. It is my intention, therefore, by the claims appended hereto, to embody all such modifications and variations as fall within the true scope and spirit of the invention.

I claim:

1. Apparatus for providing mechanical motion in response to an input, comprising:
   motion control means including a control arm responsive to the input for linearly displacing said control arm;
   power drive means for providing rotational movement, said power drive means including an elongate cylinder and means for rotating said cylinder; and
   linear drive means including a trolley assembly for providing the mechanical output, said linear drive means being coupled to said power drive means and responsive to the rotation of said cylinder and the linear displacement of said control arm for traversing said cylinder and displacing said trolley assembly such that said linear drive means provides output motion which is a function of the power supplied by said power drive means and the linear displacement of said control arm.

2. Apparatus as recited in claim 1 wherein said motion control means further comprises:
   a small low power precision motor including a rotatable shaft rotating said shaft in response to the electrical input signal; and
   means coupled to said control arm for linearly displacing said control arm in response to the angular rotation of said shaft.

3. Apparatus as recited in claim 2 wherein said means for displacing said control arm comprises a continuous belt coupled to said motor shaft at one end and coupled to an idler bearing at the other end, said control arm being coupled to intermediate said ends such that rotation of said shaft causes displacement of said continuous belt resulting in linear displacement of said control arm.

4. Apparatus as recited in claim 3 wherein said low power motor comprises a stepper motor with an incremental encoder.

5. Apparatus as recited in claim 1 wherein said linear drive means further comprises:
   movable carriage means for traversing said cylinder said movable carriage means including means for restricting the motion along said cylinder to linear motion;
   steerable wheel means for propelling said linear drive system, said steerable wheel means including an axle assembly and being adapted to rotate about said axle assembly in response to rotation of said cylinder, said axle assembly being rotationally mounted to said movable carriage means such that said axle assembly can rotate within said movable carriage to create an attack angle between the major axes of said cylinder and said axle assembly, the attack angle being zero when the major axes of said cylinder and said axle assembly are parallel in a single plane, said steerable wheel providing a propelling force to said movable carriage when the attack angle is not zero; and
   tiller means coupled to said steerable wheel means and responsive to displacement of said control arm for rotating said axle assembly and thereby altering the attack angle.

6. Apparatus as recited in claim 5 wherein said steerable wheel means comprises a cylinder having a high coefficient of friction.

7. Apparatus as recited in claim 5 wherein said motion control means further comprises:
   a low power precision motor including a rotatable shaft for rotating said shaft in response to the electrical input signal; and
   means coupled to said control arm linearly displacing said control arm in response to the angular rotation of said shaft.

8. Apparatus as recited in claim 7 wherein said means for displacing said control arm comprises a continuous belt coupled to said motor shaft at one end and coupled to an idler bearing at the other end, said control arm being coupled intermediate said ends such that rotation of said shaft causes displacement of said continuous belt resulting in linear displacement of said control arm.

9. A robot drive system for providing precision, high-power output, comprising:
   power drive means for providing a predetermined quantity of rotary power, said power drive means including a drive motor and an elongated cylinder wherein said drive motor is adapted to rotate said cylinder;
   control means for interfacing a user with the robot drive system, said electronic control means being adapted to receive user input commands indicative of the desired output mechanical motion, said electronic control means including memory for storing data indicative of the user supply mechanical motion commands, said electronic control means being responsive to the user supplied commands and said memory for supplying electrical control signals;
   mechanical motion control means including a control arm for controlling the motion of said linear drive means, said mechanical motion control means being responsive to said electrical control signal for displacing said control arm; and
   linear drive means including an output arm for providing the robot drive system output, said linear drive system being responsive to displacement of said control arm for traversing said cylinder and thereby driving said output arm.

10. Apparatus as recited in claim 9 wherein said mechanical motion control means further comprises:

transducing means for monitoring the speed of said drive motor, said transducing means being adapted to provide an electrical feedback signal indicative of the speed of said drive motor, said electronic control means being further responsive to the electrical feedback signal to modulate the electrical control signals provided to said mechanical motion control means such that during times at which the speed of said motor is less than a predetermined value, the rate at which said output arm moves is reduced to thereby reduce the instantaneous power required from said drive motor.

11. Apparatus as recited in claim 10 wherein said electronic control means further comprises:

data entry means for receiving input commands from a user;

data display means for displaying the operational status of said electronic control means to a user;

microprocessor means coupled to said data entry means and said data display means for receiving input commands from a user and for displaying the operational status of said electronic control system to a user; and interface means for interfacing said microprocessor means with said mechanical motion control means, said microprocessor means being adapted to store motion commands received from a user in said memory, said microprocessor being also adapted to provide motion commands to said interface for controlling said mechanical motion control means, said microprocessor being further adapted to perform data processing and other functions to control said mechanical motion controller.

12. Apparatus as recited in claim 11 wherein said robot drive system further comprises:

means for interfacing said electronic control means to an electronic controller of a similar robot drive system.

13. Apparatus as recited in claim 10 wherein said electronic control means comprises:

a general purpose personal computer; and means for interfacing said general purpose personal computer with said mechanical motion control means.

14. Apparatus as recited in claim 11 wherein said motion control means further comprises:

a small low power precision motor including a rotatable shaft for rotating said shaft in response to the electrical controls received from said electronic control means; and means coupled to said control arm for linearly displacing said control arm in response to the angular rotation of said shaft.

15. Apparatus as recited in claim 14 wherein said means for displacing said control arm comprises a continuous belt coupled to said motor shaft at one end and coupled to an idler bearing at the other end, said control arm being coupled intermediate said ends such that rotation of said shaft causes displacement of said continuous belt which results in linear displacement of said control arm.

16. Apparatus as recited in claim 14 wherein said low power motor comprises a stepper motor with an incremental encoder.

17. Apparatus as recited in claim 11 wherein said linear drive means further comprises:

movable carriage means including a linear bearing guide system for traversing said cylinder;

steerable wheel means for propelling said linear drive system, said steerable wheel means including an axle assembly and being adapted to rotate about said axle assembly in response to rotation of said cylinder, said axle assembly being rotationally mounted to said movable carriage means such that said axle assembly can rotate within said movable carriage to create an attack angle between the major axes of said cylinder and said axle assembly and the attack angle being zero when the major axes of said cylinder and said axle assembly are parallel in a single plane, said steerable wheel providing a propelling force to said movable carriage when the attack angle is not zero; and tiller means coupled to said steerable wheel means and responsive to displacement of said control arm for rotating said axle assembly and thereby altering the attack angle.

18. Apparatus as recited in claim 17 wherein said steerable wheel means comprises a cylinder having a high coefficient of friction.

19. Apparatus as recited in claim 17 wherein said motion control further:

a low power precision motor including a rotatable shaft for rotating said shaft in response to the electrical control signals received from said electronic control means; and means coupled to said control arm linearly displacing said control arm in response to the angular rotation of said shaft.

20. A method for controlling a mechanical amplifier in a manner such that the mechanical amplifier is capable of moving loads of various sizes independent of the quantity of driving power supplied to the amplifier, said method comprising the steps of:

(a) monitoring the speed at which the load is being moved by the mechanical amplifier;

(b) determining whether the speed at which the load is being moved by the mechanical amplifier is less than a predetermined minimum speed and, if not, returning to step (a), and, if the speed at which the load is moving is less than the predetermined minimum speed performing step (c); and (c) reducing the speed at which the load is moved by the mechanical amplifier and returning to step one.

* * * * *